2,982,764
Patented May 2, 1961

2,982,764

COPPER-CONTAINING TRISAZO DYESTUFFS

Otto Bitterlin, Basel, and Werner Bossard, Riehen, near Basel, Switzerland, assignors to J. R. Geigy A.-G., Basel, Switzerland No Drawing. Filed Mar. 31, 1958, Ser. No. 724,867

Claims priority, application Switzerland Apr. 12, 1957

6 Claims. (Cl. 260—145)

The present invention concerns a process for the production of copper-containing trisazo dyestuffs which dye cellulose material in blue-green, green-grey to blue-grey fast shades. The invention also embraces the use of these new dyestuffs as well as the material dyed therewith.

Trisazo dyestuffs for cellulose-containing fibres have already been described in which the two middle components are radicals of the benzene and naphthalene series containing alkoxy groups, which radicals are coupled in the 1.4-positions to the azo groups, and in which the end components are radicals of acylated amino-hydroxynaphthalene sulphonic acids. To our knowledge however, only such dyestuffs have attained practical importance in which at least one of the two middle components is of the naphthalene series. If these known direct dyestuffs are treated with agents giving off copper, then copper-containing dyestuffs are obtained which are insufficiently fast and/or have bad dyeing properties.

It has now been found that valuable copper-containing dyestuffs which are distinguished in particular by a remarkable fastness to light are obtained by treating trisazo dyestuffs of the general formula:

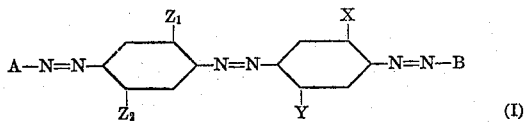

with agents giving off copper. In this formula:

A represents the radical of a carboxylic or sulphonic acid of the benzene or naphthalene series free from complex forming groups,
B represents the radical of an m-hydroxynaphthalene sulphonic acid containing an acylamino group in the β-position in the nucleus not containing sulphonic acid groups,
X represents an alkoxy group capable of complex formation,
Y represents hydrogen, halogen, an alkyl or alkoxy group, and of
$Z_1$ and $Z_2$, the one Z represents an alkoxy or alkyl group and the other Z also represents an alkoxy or an alkyl group or hydrogen or halogen.

As has already been stressed, the new copper-containing dyestuffs according to the present invention are remarkably fast to light. Regenerated cellulose material dyed therewith shows no important alteration in the original shade and hardly any adverse effect on the fastness to light when treated with anti-creasing agents. In addition, the dyeings obtained with the new dyestuffs have good fastness to acid and water. Finally, the dyestuffs are distinguished also by the fact that they dye viscose material very evenly.

The metal-free trisazo dyestuffs used according to the present invention are produced by methods known per se. For example a benzene or naphthalene diazonium compound which contains at least one carboxylic acid or sulphonic acid group is coupled with an alkoxy or alkyl aminobenzene compound coupling in the p-position to the amino group. The amino-monoazo dyestuff is further diazotised and coupled with an o-alkoxyaminobenzene compound which also couples in the p-position to the amino group, whereupon after again diazotising the amino-disazo dyestuff, the diazo-disazo dyestuff is coupled with an acylamino-hydroxynaphthalene sulphonic acid of the constitution defined.

The aminobenzene and aminonaphthalene carboxylic acids and sulphonic acids usual in polyazo dyestuffs are used as starting components. It is a condition that they contain no groups capable of complex formation; otherwise they can be further substituted as desired, for example, they can contain further halogen, nitro, alkyl, alkoxy and acylamino groups. Advantageously m- and p-aminobenzoic acids, aniline, toluidine, and xylidine sulphonic acids, chloraniline and nitraniline sulphonic acids, aniline disulphonic acids, aminobenzoic sulphonic acids, aminoacetanilide sulphonic acids as well as aminonaphthalene mono- and di-sulphonic acids are used. End products which dissolve well are obtained by using an aminonaphthalene disulphonic acid.

The alkoxy- or alkyl-aminobenzene compounds used as first middle component contain advantageously low molecular, possibly substituted, alkoxy groups, in particular methoxy, ethoxy and β-hydroxy-ethoxy groups or alkyl groups, in particular methyl groups. Particularly valuable components are those which are also further substituted in the p-position to the alkoxy or alkyl group, for example by halogen and in particular by another alkoxy or alkyl group. Examples are: 2- and 3-methoxy- or -methyl- aminobenzene, 2- and 3-ethoxy-1-aminobenzene, 2- and 3-propyloxy-1-aminobenzene, 2.5-dimethoxy-1-aminobenzene, 2.5-dimethyl-1-aminobenzene, 2.5-diethoxy-1-aminobenzene, 2.5 - di-β-hydroxyethoxy - 1 - aminobenzene, 5-methyl-2-methoxy-1-aminobenzene and 5-chloro-2-methoxy-1-aminobenzene.

The alkoxy group of the o-alkoxyaminobenzene compounds coupling in the p-position to the amino group which are used as second middle components should be easily metallisable. This is possible with the methoxy, ethoxy and carboxymethoxy group. The second middle component can also be further substituted in the p-position to the alkoxy group by further alkoxy groups, halogen or low alkyl groups. Examples are: 2-methoxy-1-aminobenzene, 2 - ethoxy-1-aminobenzene, 5 - methyl-2-methoxy-1 -aminobenzene, 5 -methyl- 2 -ethoxy- 1 -aminobenzene, 5-chloro-2-methoxy-1-aminobenzene, 2-carboxymethoxy-5-methyl-1-aminobenzene and 2.5-dimethoxy-1-aminobenzene.

Those acylamino-hydroxynaphthalene sulphonic acids are used as end components which in one ring contain an m-hydroxy sulphonic acid grouping and in the other the acylamino group in β-position. By acylamino group is meant here the amino group substituted by a functional carboxylic acid radical. Radicals of carbonic acid derivatives, of aliphatic and aromatic, possibly polyvalent carboxylic acid can be used. Examples are the formyl, acetyl, chloracetyl, propionyl, butyryl, sulphoacetyl, oxalyl, maleinyl, methoxycarbonyl, ethoxycarbonyl, β-methoxyethoxycarbonyl, benzoyl, 4-methylbenzoyl and 4-chlorobenzoyl radicals. Examples of end components are: the 2-acetylamino-6-hydroxynaphthalene-8-sulphonic acid, 2-sulphoacetylamino - 6 - hydroxynaphthalene-8-sulphonic acid, 2-carbomethoxy- and -carbethoxy-amino-6-hydroxynaphthalene-8-sulphonic acids, 2-carbo-β-methoxyethoxyamino-6-hydroxynaphthalene-8-sulphonic acid, 2-oxalylamino-6-hydroxynaphthalene-8-sulphonic acid, 2-benzoylamino - 6 - hydroxynaphthalene-8-sulphonic acid, 2-(4'-methylbenzoylamino)- 6 -hydroxynaphthalene-8-sulphonic acid and 2-(4'-chlorobenzoyl-amino)-6-hydroxynaphthalene-8-sulphonic acid. The acyl derivatives of 2-amino-6-hydroxynaphthalene-8-sulphonic acid are particularly valuable end components as they produce copper-containing dyestuffs according to the present invention which are very fast to light and water. However, on using 2-acylamino-8-hydroxynaphthalene-6-sulphonic acids and 2-acylamino-5-hydroxynaphthalene-7-sulphonic acids, valuable copper-containing dyestuffs are also obtained.

The diazo components, middle components and end components of the type mentioned are the starting materials usual in the dyestuff industry. The diazotisation of the starting components of the amino mono- and disazo-dyestuffs as well as the coupling of the middle and end components is performed according to the methods usual in the production of such polyazo dyestuffs.

The usual methods are used for the treatment of the trisazo dyestuffs used according to the present invention with agents giving off copper. For example, the treatment can be made in a weakly acid medium. Advantageously the coppering is performed in an aqueous/alkaline medium at a raised temperature and, as basic reactants advantageously ammonia or water soluble primary, secondary or tertiary amines such as, for example monoethylamine, monoethanolamine, diethylamine, cyclohexylamine, pyridine or 2.6-dimethylpyridine are used. In particular the copper tetramine complexes obtained by known methods from copper salts and ammonia or organic bases of the type listed above are used as agents giving off copper.

It is favourable for the dyeing properties of the copper-containing end products if the trisazo dyestuffs used according to the present invention contain two sulphonic acid groups to each dyestuff molecule and, on using starting components from the naphthalene series, three sulphonic acid groups to each dyestuff molecule. Particularly valuable end products are obtained in particular from trisazo dyestuffs which contain as first middle component a 2.5-dialkoxyaminobenzene compound and as second middle component, 5-methyl-2-methoxy-1-aminobenzene. Copper-containing dyestuffs with such middle components are distinguished by favourable dyeing properties and in addition by their valuable bluish-grey shades. If they also contain the acylation products of 2-amino-6-hydroxynaphthalene-8-sulphonic acid as end components, they also have very good fastness to light and water.

Further details can be seen from the following examples. These serve to illustrate the invention without limiting it in any way however. Where not otherwise stated, in these examples parts are given as parts by weight and the temperatures are in degrees centigrade. The relationship of parts by weight to parts by volume is that of kilograms to litres.

EXAMPLE 1

The solution of 16 parts of 2.5-dimethoxy-1-aminobenzene in 200 parts of water and 15 parts of 30% hydrochloric acid is poured at 0–5° into the diazonium compound from 17.3 parts of 3-aminobenzene-1-sulphonic acid. The coupling is completed by the slow addition of 20 parts of sodium acetate in 80 parts of water. The completely formed monoazo dyestuff is dissolved by the addition of 20 parts of sodium carbonate at 70° and is diazotised at 20–25° with 6.9 parts of sodium nitrite and 73 parts of 30% hydrochloric acid in the presence of 220 parts of sodium chloride. The insoluble diazonium compound is filtered off and is stirred with 300 parts of water. The solution of the hydrochloride of 13.7 parts of 2-methoxy-5-methyl-1-aminobenzene in 150 parts of water and then 15 parts of sodium acetate in 40 parts of water are added to this suspension dropwise. On completion of the coupling, the paste of the diazo dyestuff is made alkaline with 15 parts of sodium carbonate, warmed to about 70° and, after the addition of sodium chloride, is filtered. The aminodisazo compound is again pasted in 1300 parts of water and 1 part of sodium hydroxide and diazotised at 20–25° with 6.9 parts of sodium nitrite and 61 parts of 30% hydrochloric acid. After some hours, the diazonium compound is filtered off, stirred in 800 parts of ice water and coupled with the ice cold solution of the sodium salt of 29.7 parts of 2-carbomethoxyamino-6-hydroxynaphthalene-8-sulphonic acid, 10 parts of sodium carbonate, 180 parts of pyridine and 400 parts of water to form the trisazo dyestuff. The completely formed dyestuff is salted out, filtered off, dissolved in 1500 parts of water and converted into the copper complex compound of the formula:

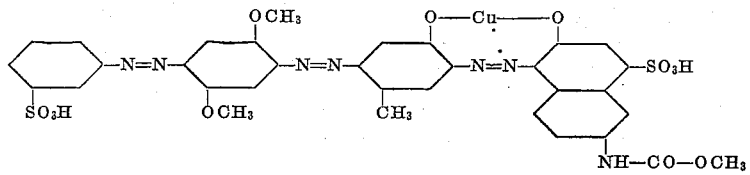

by heating for 5 hours at 80° with 25 parts of crystallised copper sulphate in the presence of 75 parts of 25% ammonia and 75 parts of diethylamine. 75 parts of sodium chloride are added, the copper complex is filtered off and dried. The copper-containing trisazo dyestuff is a dark powder which dissolves in water with a green-grey and in concentrated sulphuric acid with a violet-grey colour.

The same result is obtained if the trisazo dyestuff is heated at 95° for 20–40 hours with just 25 parts of crystallised copper sulphate and 75 parts of 25% ammonia, or if additives such as monoethanolamine or pyridine are added. Also boiling under reflux for 40 hours with 25 parts of crystallised copper sulphate and 15 parts of sodium acetate leads to the same product.

Cellulose fibres are dyed with this complex copper compound in greenish-grey shades. The dyeings have excellent water fastness properties and very good fastness to light. The shade of the dyeing is hardly altered by anti-crease processing and the fastness to light is excellent.

If, in this example instead of 29.7 parts of 2-carbomethoxyamino - 6 - hydroxynaphthalene-8-sulphonic acid, 28.1 parts of 2-acetylamino-6-hydroxynaphthalene-8-sulphonic acid are used, or instead of 17.3 parts of 3-aminobenzene-1-sulphonic acid and the 29.7 parts of 2-carbomethoxyamino-6-hydroxynaphthalene - 8 - sulphonic acid, 13.7 parts of 3-aminobenzene-1-carboxylic acid and 28.1 parts of 2-acetylamino-6-hydroxynaphthalene-8-sulphonic acid are used and the same procedure is followed, then dyestuffs having similar properties are obtained.

EXAMPLE 2

The sodium salt of the trisazo dyestuff from 30.3 parts of 2-aminonaphthalene-4.8-disulphonic acid, 16 parts of 2.5-dimethoxy-1-aminobenzene, 13.7 parts of 2-methoxy-5-methyl-1-aminobenzene and 28.1 parts of 2-acetylamino-5-hydroxynaphthalene-7-sulphonic acid produced by the method described in Example 1, is dissolved in 2000 parts of water and converted into the copper complex compound by heating for 10 hours at 90° with 25 parts of crystallised copper sulphate in the presence of 75 parts of 25% ammonia and 100 parts of diethylamine. The copper-containing trisazo dyestuff of the formula:

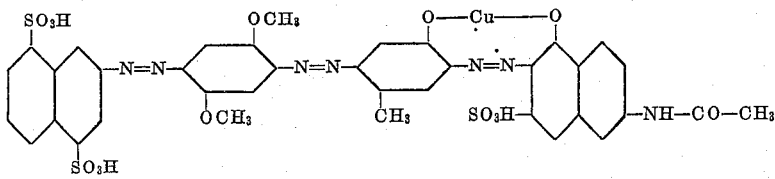

is filtered off and in a dry condition is a dark powder which dissolves in water with a grey-blue and in concentrated sulphuric acid with a blue-grey colour. The dyestuff produces blueish-grey dyeings on cellulose fibres which have been anti-crease processed. The dyeings have good wet and light fastness properties.

The copper complex formation is also completed if the trisazo dyestuff is treated at 95° in 2000 parts of water with 25 parts of copper sulphate and 75 parts of 25% ammonia alone or with the addition of 50 parts of monoethanolamine or of 10 parts of pyridine.

If, in the production of the above trisazo dyestuff, 28.1 parts of 2-acetylamino-8-hydroxynaphthalene-6-sulphonic acid are used instead of 28.1 parts of 2-acetylamino-5-hydroxynaphthalene-7-sulphonic acid and otherwise the same procedure is followed, then a copper-containing dyestuff with similar properties is obtained.

EXAMPLE 3

74.7 parts of the trisazo dyestuff 3-aminobenzene-1-sulphonic acid→3-methoxy-1-aminobenzene→2-methoxy-5-methyl-1-aminobenzene→2-acetylamino-6-hydroxynaphthalene-8-sulphonic acid, produced analogously to the manner described in Example 1, are dissolved in 2000 parts of water. The copper complex compound is produced by heating for 20 hours at 95° with 25 parts of crystallised copper sulphate and 75 parts of 25% ammonia. The copper complex is salted out, filtered off and dried. It is a dark powder which dissolves both in water and in concentrated sulphuric acid with a green-grey colour. The copper containing dyestuff of the formula:

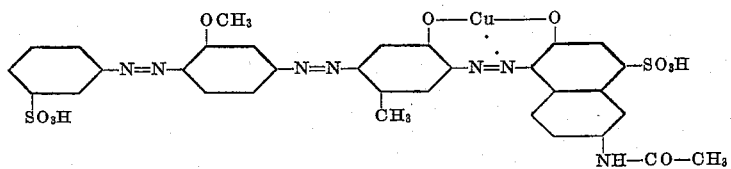

dyes cellulose-containing fibres in green-grey shades. It has good wet fastness properties and retains good fastness to light also after anti-crease processing.

The copper complex compound is also obtained if the trisazo dyestuff is treated for 10 hours with the addition of 100 parts of pyridine or 100 parts of diethylamine.

If in the production of the trisazo dyestuff of the above formula, the 2-acetylamino-6-hydroxynaphthalene-8-sulphonic acid is replaced by 2-carbomethoxy-amino-6-hydroxynaphthalene-8-sulphonic acid and the same procedure is followed, then a similar greenish dyestuff is obtained which has similar properties.

EXAMPLE 4

77.9 parts of the trisazo dyestuff of the formula:

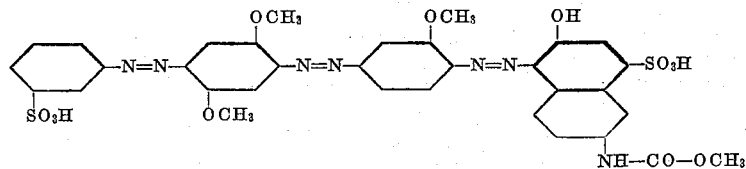

in the form of the sodium salt are dissolved in 1000 parts of water and the solution is stirred for 40 hours with 25 parts of crystallised copper sulphate and 15 parts of sodium acetate at 95°. The copper complex compound formed is salted out and filtered off. The dried dyestuff is a dark powder which dissolves in water with a blueish-grey and in concentrated sulphuric acid with a violet-grey colour. The greenish-grey dyeings on cellulose fibres have remarkable wet fastness properties and very good fastness to light which is also retained after anti-crease processing.

If the trisazo dyestuff is treated for 20–40 hours with 25 parts of copper sulphate and 75 parts of 25% ammonia alone or for 10 hours with the addition of 50 parts of pyridine, then a similar copper complex compound is obtained.

If in the production of the trisazo dyestuff of the formula given above, the 2-methoxy-1-aminobenzene is replaced by 2-carboxymethoxy-5-methyl-1-aminobenzene and the 2-carbomethoxyamino-6-hydroxynaphthalene-8-sulphonic acid is replaced by 2-acetylamino-6-hydroxynaphthalene-8-sulphonic acid and the same procedure is followed, then a copper-containing dyestuff is obtained which has similar properties.

EXAMPLE 5

The sodium salt of the trisazo dyestuff produced according to the method described in Example 1 from 17.3 parts of 3-aminobenzene-1-sulphonic acid, 18.5 parts of 2.5-di-β-hydroxyethoxy-1-aminobenzene, 13.7 parts of 2-methoxy-5-methyl-1-aminobenzene and 28.1 parts of 2-acetylamino-6-hydroxynaphthalene-8-sulphonic acid is dissolved in 1500 parts of water and converted into the copper complex compound by heating for 30 hours at 95° with 25 parts of crystallised copper sulphate and 75 parts of 25% ammonia. The copper-containing dyestuff of the formula:

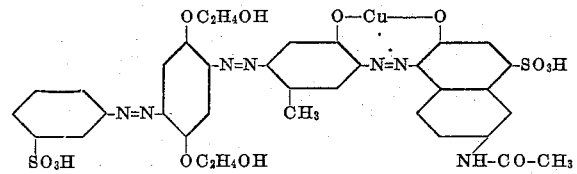

is salted out, filtered off and dried. It is a dark powder which dissolves in water with a blue-grey and in concentrated sulphuric acid with a violet-grey colour. Greenish-grey dyeings are obtained therewith which have good wet fastness properties and remarkable fastness to light which is retained after anti-crease processing. The same copper compound is also obtained if the trisazo dyestuff is treated under the same conditions as described but with the addition of 50 parts of cyclohexylamine or 75 parts of dimethylamine.

and converted into the copper complex compound of the formula:

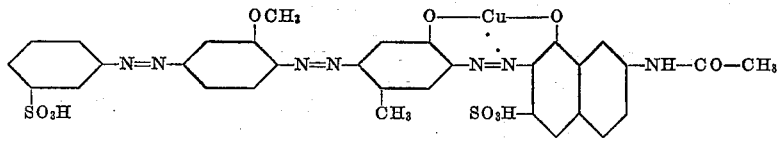

If in this example, 35.7 parts of 2-(4'-methylbenzoylamino)-6-hydroxynaphthalene-8-sulphonic acid or 31.1 parts of 2-carbomethoxyamino-6-hydroxynaphthalene-8-sulphonic acid are used instead of 28.1 parts of 2-acetylamino-6-hydroxynaphthalene-8-sulphonic acid and otherwise the same procedure as described above is followed, then dyestuffs having similar properties are obtained.

EXAMPLE 6

The following trisazo dyestuff is produced by coupling 17.3 parts of diazotised 3-amino-benzene-1-sulphonic acid with 13.0 parts of 2-methoxy-1-aminobenzene as ω-methane sulphonic acid to form the monoazo dyestuff, converting into the amino monoazo compound by saponifying, further diazotising this, then coupling in an acetic acid medium with 13.7 parts of 2-methoxy-5-methyl-1-aminobenzene to form the disazo dyestuff, again diazotising and coupling with 28.1 parts of 2-acetylamino-8-hydroxynaphthalene-6-sulphonic acid in the presence of pyridine, similar to the method described in Example 1. The dyestuff paste is dissolved in 1500 parts of water by heating for 10 hours at 95° with 25 parts of crystallised copper sulphate, 75 parts of 25% ammonia and 50 parts of monoethanolamine. The copper-containing trisazo dyestuff is filtered off and dried. The dark powder dissolves in water with a green-grey and in concentrated sulphuric acid with a blue-grey colour. Cellulose fibres are dyed in greenish-grey shades and the dyeings have good fastness to wet and light. The dyeings undergo anticrease processing very well.

Dyestuffs with similar properties are obtained if in the above example the 13.0 parts of 2-methoxy-1-aminobenzene are replaced by 17 parts of 5-chloro-2-methoxy-1-aminobenzene or by 16 parts of 2.5-dimethoxy-1-aminobenzene and otherwise the same procedure is followed.

If the components listed in the following Table 1 are used in the amounts given as described in Examples 1–6, then similar copper-containing trisazo dyestuffs are obtained. The shade of the copper complex compound on cotton is given in the last column.

*Table 1*

| No. | Starting component | 1st middle component | 2nd middle component | End component | Shade |
|---|---|---|---|---|---|
| 1 | 2-aminonaphthalene-4.8-disulphonic acid (30.3 parts). | 5-chloro-2-methoxy-1-aminobenzene (15.75 parts). | 5-methyl-2-methoxy-1-aminobenzene (13.7 parts). | 2-carbo-β-methoxy-ethoxyamino-6-hydroxynaphthalene-8-sulphonic acid (34.1 parts). | Green-grey. |
| 2 | ....do.... | 5-methyl-2-methoxy-1-aminobenzene (13.7 parts). | 5-chloro-2-methoxy-1-aminobenzene (15.75 parts). | ....do.... | Greenish grey. |
| 3 | 2-aminonaphthalene-6.8-disulphonic acid (30.3 parts). | 2.5-diethoxy-1-aminobenzene (18.1 parts). | 2-methoxy-5-methyl-1-aminobenzene (13.7 parts). | 2-benzoyl-6-hydroxynaphthalene-8-sulphonic acid (34.3 parts). | Do. |
| 4 | 2-aminobenzoic acid-5-sulphonic acid (21.7 parts). | 5-methyl-2-methoxy-1-aminobenzene (13.7 parts). | ....do.... | 2-carbethoxyamino-6-hydroxynaphthalene-8-sulphonic acid (31.1 parts). | Green-grey. |
| 5 | ....do.... | ....do.... | ....do.... | 2-carbo-β-methoxy-ethoxyamino-6-hydroxynaphthalene-8-sulphonic acid (34.1 parts). | Do. |
| 6 | 4-aminobenzene-1-sulphonic acid (17.3 parts). | 2.5-dimethoxy-1-aminobenzene (15.3 parts). | ....do.... | 2-acetylamino-6-hydroxynaphthalene-8-sulphonic acid (28.1 parts). | Do. |
| 7 | ....do.... | ....do.... | ....do.... | 2-ω-sulphoacetylamino-6-hydroxynaphthalene-8-sulphonic acid (36.1 parts). | Do. |
| 8 | 2-nitro-1-aminobenzene-4-sulphonic acid (21.8 parts). | 2.5-dimethoxy-1-amino-benzene (15.3 parts). | 5-methyl-2-methoxy-1-aminobenzene (13.7 parts). | ....do.... | Greenish-grey. |
| 9 | ....do.... | ....do.... | ....do.... | 2-acetylamino-6-hydroxynaphthalene-8-sulphonic acid (28.1 parts). | Do. |
| 10 | 3-aminobenzene-1-sulphonic acid (17.3 parts). | 2.5-dimethoxy-1-aminobenzene (15.3 parts). | 5-methyl-2-methoxy-1-aminobenzene (13.7 parts). | 2-benzoylamino-6-hydroxynaphthalene-8-sulphonic acid (34.3 parts). | Do. |
| 11 | 2-aminobenzene-1-sulphonic acid (17.3 parts). | ....do.... | ....do.... | 2-acetylamino-6-hydroxynaphthalene-8-sulphonic acid (28.1 parts). | Green-grey. |
| 12 | 4-methyl-1-aminobenzene-3-sulphonic acid (18.7 parts). | ....do.... | ....do.... | ....do.... | Do. |
| 13 | 4-aminobenzoic acid (13.7 parts). | ....do.... | ....do.... | ....do.... | Do. |
| 14 | 3-aminobenzene-1-sulphonic acid (17.3 parts). | 2.5-di-β-hydroxy-ethoxy-1-aminobenzene (18.5 parts). | ....do.... | 2-carbomethoxy-amino-5-hydroxynaphthalene-7-sulphonic acid (29.7 parts). | Do. |
| 15 | ....do.... | ....do.... | ....do.... | 2-carboethoxy-amino-8-hydroxynaphthalene-6-sulphonic acid (31.1 parts) | Do. |
| 16 | 2.4-dimethyl-1-amino-benzene-6-sulphonic acid (20.1 parts). | 2.5-dimethoxy-1-aminobenzene (15.3 parts). | 5-chloro-2-methoxy-1-aminobenzene (15.75 parts). | 2-ω-sulphoacetyl-amino-8-hydroxy-naphthalene-6-sulphonic acid (36.1 parts). | Greenish-grey. |
| 17 | ....do.... | ....do.... | ....do.... | 2-ω-sulphoacetyl-amino-5-hydroxynaphthalene-7-sulphonic acid (36.1 parts). | Do |
| 18 | 2-aminobenzene-1-sulphonic acid (17.3 parts). | 5-methyl-2-methoxy-1-aminobenzene (13.7 parts). | 2-methoxy-1-aminobenzene (12.3 parts). | 2-acetylamino-5-hydroxynaphthalene-7-sulphonic acid (28.1 parts). | Bluish-grey. |
| 19 | 4-aminobenzene-1-sulphonic acid (17.3 parts). | ....do.... | ....do.... | ....do.... | Do. |
| 20 | ....do.... | 2-methoxy-1-aminobenzene (12.3 parts). | 5-methyl-2-methoxy-1-aminobenzene (13.7 parts). | 2-carbomethoxy-amino-8-hydroxynaphthalene-6-sulphonic acid (29.7 parts). | Greenish-grey. |
| 21 | 3-aminobenzene-1-sulphonic acid (17.3 parts). | 2.5-dimethoxy-1-aminobenzene (15.3 parts). | ....do.... | ....do.... | Grey. |
| 22 | 2-amino-naphthalene-6.8-disulphonic acid (30.3 parts). | 5-chloro-2-methoxy-1-aminobenzene (15.75 parts). | ....do.... | 2-carbo-β-methoxy-ethoxyamino-8-hydroxynaphthalene-6-sulphonic acid (34.1 parts). | Do. |
| 23 | ....do.... | ....do.... | ....do.... | 2-carbo-β-methoxy-ethoxyamino-5-hydroxynaphthalene-7-sulphonic acid (34.1 parts). | Bluish-grey. |

Table I—Continued

| No. | Starting component | 1st middle component | 2nd middle component | End component | Shade |
|---|---|---|---|---|---|
| 24 | 4-amino-1-acetylamino-benzene-2-sulphonic acid (23.0 parts). | 3-methoxy-1-aminobenzene (12.3 parts). | 5-methyl-2-methoxy-1-aminobenzene (13.7 parts). | 2-ω-sulphoacetyl-amino-8-hydroxy-naphthalene-6-sulphonic acid (36.1 parts). | Green-grey. |
| 25 | 3-aminobenzene-1-sulphonic acid (17.3 parts). | 3-methoxy-1-aminobenzene (12.3 parts). | 5-methyl-2-methoxy-1-aminobenzene (13.7 parts). | 2-acetylamino-8-hydroxynaphthalene-6-sulphonic acid (28.1 parts). | Do. |
| 26 | 4-amino-1-acetylamino-benzene-2-sulphonic acid (23.0 parts). | 2-methoxy-1-aminobenzene (12.3 parts). | do | do | Do. |
| 27 | 2-nitro-1-aminobenzene-4-sulphonic acid (21.8 parts). | 2.5-dimethoxy-1-aminobenzene (15.3 parts). | do | do | Bluish-grey. |
| 28 | 1-aminonaphthalene-4-sulphonic acid (22.3 parts). | 2.5-di-β-hydroxy-ethoxy-1-aminobenzene 18.5 parts). | 2-carboxy-methoxy-5-methyl-1-aminobenzene (18.1 parts). | 2-ω-sulphoacetyl-amino-5-hydroxy-naphthalene-7-sulphonic acid (36.1 parts). | Do. |
| 29 | 4-chloro-1-aminobenzene-2-sulphonic acid (20.75 parts). | do | do | do | Do. |
| 30 | 4-methyl-1-aminobenzene-3-sulphonic acid (18.7 parts). | do | do | do | Do. |
| 31 | 1-aminonaphthalene-7-sulphonic acid (22.3 parts). | 2.5-dimethoxy-1-aminobenzene (15.3 parts). | 2-methoxy-1-aminobenzene (12.3 parts). | 2-ω-sulphoacetylamino-8-hydroxy-naphthalene-6-sulphonic acid (36.1 parts). | Greenish-grey. |
| 32 | do | do | do | 2-carbo-β-methoxy-ethoxyamino-8-hydroxynaphthalene-6-sulphonic acid (34.1 parts). | Do. |
| 33 | 2-aminonaphthalene-6-sulphonic acid (22.3 parts). | 2.5-dimethoxy-1-aminobenzene (15.3 parts). | 5-methyl-2-methoxy-1-aminobenzene (13.7 parts). | 2-carbo-β-methoxyethoxyamino-5-hydroxynaphthalene-7-sulphonic acid (34.1 parts). | Bluish-grey. |
| 34 | do | do | do | 2-carbomethoxyamino-5-hydroxy-naphthalene-7-sulphonic acid (29.7 parts). | Do. |
| 35 | 3-aminobenzene-1-sulphonic acid (17.3 parts). | do | do | 2-benzoylamino-5-hydroxynaphthalene-7-sulphonic acid (34.3 parts) | Do. |
| 36 | do | do | do | 2-benzoylamino-8-hydroxynaphthalene-6-sulphonic acid (34.3 parts). | Greenish-grey. |
| 37 | 1-aminobenzene-2.5-disulphonic acid (25.3 parts). | 2.5-diethoxy-1-aminobenzene (18.1 parts). | do | do | Do. |
| 38 | 3-aminobenzene-1-sulphonic acid (17.3 parts). | 2.5-dimethoxy-1-amino-benzene (15.3 parts). | do | 2-carboethoxyamino-5-hydroxy-naphthalene-7-sulphonic acid (31.1 parts). | Blueish-grey. |
| 39 | 1-aminonaphthalene-6-sulphonic acid (22.3 parts). | do | do | do | Do. |
| 40 | do | do | do | 2-carboethoxyamino-8-hydroxy-naphthalene-6-sulphonic acid (31.1 parts). | Do. |
| 41 | 1-aminobenzene-2.5-disulphonic acid (25.3 parts). | 2.5-diethoxy-1-aminobenzene (18.1 parts). | do | 2-benzoylamino-5-hydroxynaphthalene-7-sulphonic acid (34.3 parts). | Do. |
| 42 | 2-aminonaphthalene-4.8-disulphonic acid (30.3 parts). | 2.5-dibutyloxy-1-aminobenzene (23.7 parts). | 5-methyl-2-methoxy-1-aminobenzene (13.7 parts). | 2-acetylamino-5-hydroxynaphthalene-7-sulphonic acid (28.1 parts). | Green grey. |
| 43 | 3-aminobenzoic acid (13.7 parts). | 2.5-dimethoxy-1-aminobenzene (15.3 parts). | 5-methyl-2-methoxy-1-aminobenzene (13.7 parts). | 2-carbo-β-methoxyethoxyamino-8-hydroxynaphthalene-6-sulphonic acid (34.1 parts). | Do. |
| 44 | 3-aminobenzoic acid (13.7 parts). | do | do | 2-acetylamino-8-hydroxynaphthalene-6-sulphonic acid (28.1 parts). | Do. |
| 45 | 4-aminobenzoic acid (13.7 parts). | do | 5-methyl-2-ethoxyl-1-aminobenzene (18.1 parts). | do | Do. |
| 46 | 3-aminobenzene-1-sulphonic acid (17.3 parts). | 5-methyl-2-methoxy-1-aminobenzene (13.7 parts). | 2.5-diethoxy-1-aminobenzene (18.1 parts). | 2-acetylamino-5-hydroxynaphthalene-7-sulphonic acid (28.1 parts). | Blue-grey. |

EXAMPLE 7

17.3 parts of 2-aminobenzene-1-sulphonic acid are diazotised and 12.6 parts of 2.5-dimethyl-1-aminobenzene are added at 20°. The coupling is completed by the addition of sodium acetate and the precipitated monoazo dyestuff is filtered off. It is stirred in water at 20–25°, 6.9 parts of sodium nitrite are added and it is diazotised by the addition of 73 parts of 30% hydrochloric acid. The insoluble diazonium compound is filtered off and stirred in 300 parts of cold water. The hydrochloride of 13.7 parts of 2-methoxy-5-methyl-1-aminobenzene in 150 parts of water is added to this suspension and then the solution of 15 parts of sodium acetate in 40 parts of water is added. On completion of the coupling, the disazo dyestuff suspension is mixed with 15 parts of sodium carbonate, the mixture having an alkaline reaction, and sodium chloride is added at 80°. The aminodisazo dyestuff which precipitates is further diazotised as described in Example 1, the diazonium compound is precipitated and stirred in 800 parts of ice water. This diazo suspension is coupled by the known method with 28.1 parts of 2-acetylamino-6-hydroxynaphthalene-8-sulphonic acid to form the trisazo dyestuff and the dyestuff formed is salted out and filtered off. After dissolving it in 2000 parts of water, 25 parts of crystallised copper sulphate are added in the presence of 75 parts of 25% ammonia and 100 parts of diethylamine and the dyestuff is then converted into the copper complex compound by heating for 10 hours at 90°. The copper-containing trisazo dyestuff of the formula:

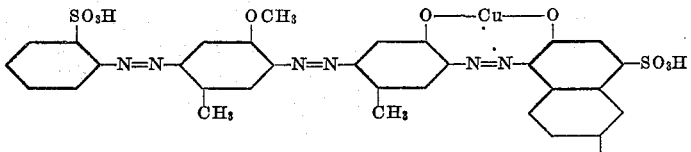

is then salted out, filtered off and dried. It is a dark powder which dissolves in water with a blue-green and in concentrated sulphuric acid with a blue-grey colour. The dark green dyeings on cellulose fibres have very good wet and light fastness properties and are suitable for anti-crease processing.

If the components listed in the following Table 2 are used in the amounts given and the procedure described in Example 7 is followed, then similar copper-containing trisazo dyestuffs are obtained.

Table 2

| No. | Starting component | 1st middle component | 2nd middle component | End component | Shade |
|---|---|---|---|---|---|
| 1 | 2-aminobenzene-1-sulphonic acid (17.3 parts). | 2.5-dimethyl-1-aminobenzene (12.1 parts). | 5-methyl-2-methoxy-1-aminobenzene (13.7 parts). | 2-carbomethoxyamino-6-hydroxynaphthalene-8-sulphonic acid (29.7 parts). | Blue-green. |
| 2 | ____do____ | 3-methyl-1-aminobenzene (10.7 parts). | ____do____ | ____do____ | Do. |
| 3 | ____do____ | ____do____ | ____do____ | 2-acetylamino-6-hydroxynaphthalene-8-sulphonic acid (28.1 parts). | Do. |
| 4 | ____do____ | 2-methyl-1-aminobenzene (10.7 parts). | ____do____ | ____do____ | Do. |
| 5 | 3-aminobenzene-1-sulphonic acid (17.3 parts). | 2.5-dimethyl-1-aminobenzene (12.1 parts). | ____do____ | ____do____ | Grey-green. |
| 6 | 4-aminobenzene-1-sulphonic acid (17.3 parts). | ____do____ | ____do____ | ____do____ | Blue-green. |
| 7 | ____do____ | ____do____ | ____do____ | 2-carbomethoxyamino-6-hydroxynaphthalene-8-sulphonic acid (29.7 parts). | Olive green. |
| 8 | 2.4-dimethyl-1-aminobenzene-6-sulphonic acid (20.1 parts). | ____do____ | ____do____ | 2-acetylamino-6-hydroxynaphthalene-8-sulphonic acid (28.1 parts). | Blue-green. |
| 9 | 2-methyl-1-aminobenzene-5-sulphonic acid (18.7 parts). | ____do____ | ____do____ | ____do____ | Grey-green. |
| 10 | 2-methyl-1-aminobenzene-5-sulfonic acid (18.7 parts). | 2.5-dimethyl-1-aminobenzene (12.1 parts). | 5-methyl-2-methoxy-1-aminobenzene (13.7 parts). | 2-acetylamino-8-hydroxynaphthalene-6-sulphonic acid (28.1 parts). | Violet-grey. |
| 11 | 2-aminonaphthalene-4.8-disulphonic acid (30.3 parts). | 3-methyl-1-aminobenzene (10.7 parts). | ____do____ | ____do____ | Green-grey. |
| 12 | ____do____ | ____do____ | ____do____ | 2-acetylamino-6-hydroxynaphthalene-8-sulphonic acid (28.1 parts). | Olive-grey. |
| 13 | 2-aminobenzene-1-sulphonic acid (17.3 parts). | 2.5-dimethyl-1-aminobenzene (12.1 parts). | 2.5-dimethoxy-1-aminobenzene (15.3 parts). | ____do____ | Blue-green. |
| 14 | ____do____ | 3-methyl-1-aminobenzene (10.7 parts). | ____do____ | 2-carbomethoxyamino-6-hydroxynaphthalene-8-sulphonic acid (29.7 parts). | Do. |
| 15 | ____do____ | ____do____ | 2.5-di-β-hydroxyethoxy-1-aminobenzene (18.5 parts). | 2-acetylamino-8-hydroxynaphthalene-6-sulphonic acid (28.1 parts). | Green-grey. |

EXAMPLE 8

1.5 parts of the copper-containing trisazo dyestuff obtained according to Example 1 is dissolved in a dyebath containing 3000 parts of water and 2 parts of sodium carbonate. 100 parts of cotton are entered at 40–50°, the bath is heated to 90–95° within 30 minutes and then 30 parts of sodium sulphate are added. Dyeing is performed for 45 minutes at this temperature and then the goods are rinsed and dried. The cotton is dyed in greenish-grey shades which have good wet fastness properties and very good fastness to light. The dyed goods can be subjected to anti-crease processing without any noticeable change in the shade or in the fastness to light.

What we claim is:

1. A cupriferous trisazo dyestuff of the general formula:

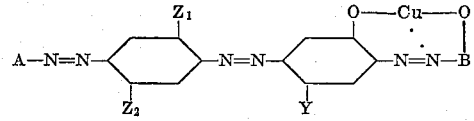

wherein

A represents radicals selected from the group consisting of the benzene and naphthalene series containing at least an acid group selected from the group consisting of —$SO_3H$ and —COOH and being free from copper complex-forming groups, B represents the radical of an m-hydroxynaphthalene monosulphonic acid bound to the azo group in o-position to the hydroxyl group and containing an acylamino group in the β-position in the nucleus having no sulphonic acid group, Y represents a member selected from the group consisting of hydrogen, halogen, lower alkyl and alkoxy groups, and of $Z_1$ and $Z_2$, one Z represents a member selected from the group consisting of lower alkyl and alkoxy groups, the other Z represents a member selected from the group consisting of hydrogen, halogen, lower alkyl and alkoxy groups.

2. A cupriferous trisazo dyestuff of the formula:

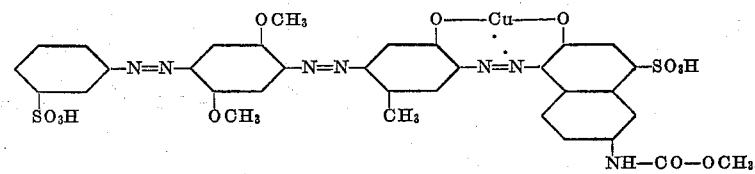

3. A cupriferous trisazo dyestuff of the formula:

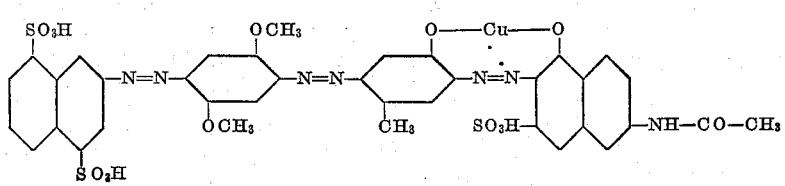

4. A cupriferous trisazo dyestuff of the formula:
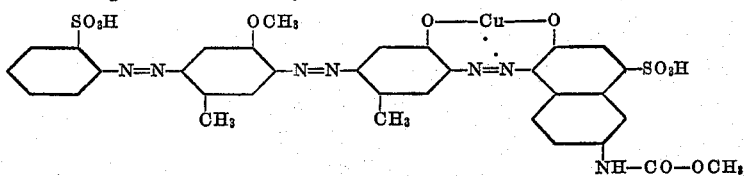
5. A cupriferous trisazo dyestuff of the formula:
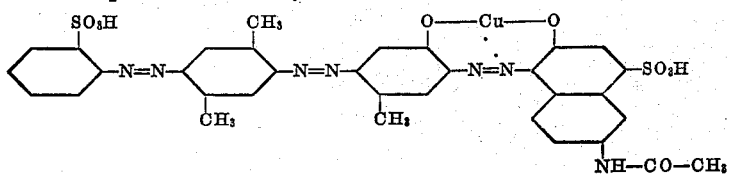
6. A cupriferous trisazo dyestuff of the formula:
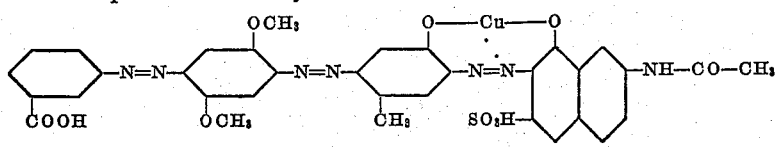
References Cited in the file of this patent
UNITED STATES PATENTS
2,769,805    Hanhart _____ Nov. 6, 1956